(12) United States Patent
Gagnon et al.

(10) Patent No.: US 8,131,635 B2
(45) Date of Patent: Mar. 6, 2012

(54) METHOD AND SYSTEM TO MANAGE A CREDIT PORTFOLIO AND TO TRIGGER CREDIT ACTIONS

(75) Inventors: Kris Gagnon, Winnetka, IL (US);
Bridget Garavalia, Joliet, IL (US);
Hetty E. Harlan, River Forest, IL (US);
Michael McKay, Wilton, CT (US);
Jackie Noble, Charlotte, NC (US); Arun Pinto, Charlotte, NC (US); Vipin Ramani, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 2374 days.

(21) Appl. No.: 10/709,184

(22) Filed: Apr. 20, 2004

(65) Prior Publication Data
US 2005/0234792 A1  Oct. 20, 2005

(51) Int. Cl.
*G06Q 40/00* (2006.01)
(52) U.S. Cl. .......................................... 705/38
(58) Field of Classification Search .................. 705/38
See application file for complete search history.

(56) References Cited

U.S. PATENT DOCUMENTS

| | | | | |
|---|---|---|---|---|
| 5,774,883 A * | 6/1998 | Andersen et al. | | 705/38 |
| 2002/0038273 A1 * | 3/2002 | Wherry et al. | | 705/36 |
| 2002/0147670 A1 * | 10/2002 | Lange | | 705/35 |
| 2003/0040941 A1 * | 2/2003 | Whitworth | | 705/4 |
| 2003/0233278 A1 * | 12/2003 | Marshall | | 705/14 |
| 2004/0044615 A1 * | 3/2004 | Xue et al. | | 705/38 |
| 2004/0267660 A1 * | 12/2004 | Greenwood et al. | | 705/38 |

\* cited by examiner

*Primary Examiner* — Harish T Dass
*Assistant Examiner* — Michael Cranford
(74) *Attorney, Agent, or Firm* — Moore & Van Allen PLLC; Ryan Harris

(57) ABSTRACT

A method to trigger credit actions may include determining a quantity of triggers flagged for a selected creditor. The method may also include establishing an action plan in response to the quantity of flagged triggers being greater than the predetermined number. In accordance with another embodiment of the present invention, a system to trigger credit actions may include a processor and at least one trigger. The system may also include a credit action program operable on the processor to generate a sires of inquiries and to determine a quantity of the at least one trigger being flagged based on the responses to the series of inquiries for a selected creditor.

33 Claims, 3 Drawing Sheets

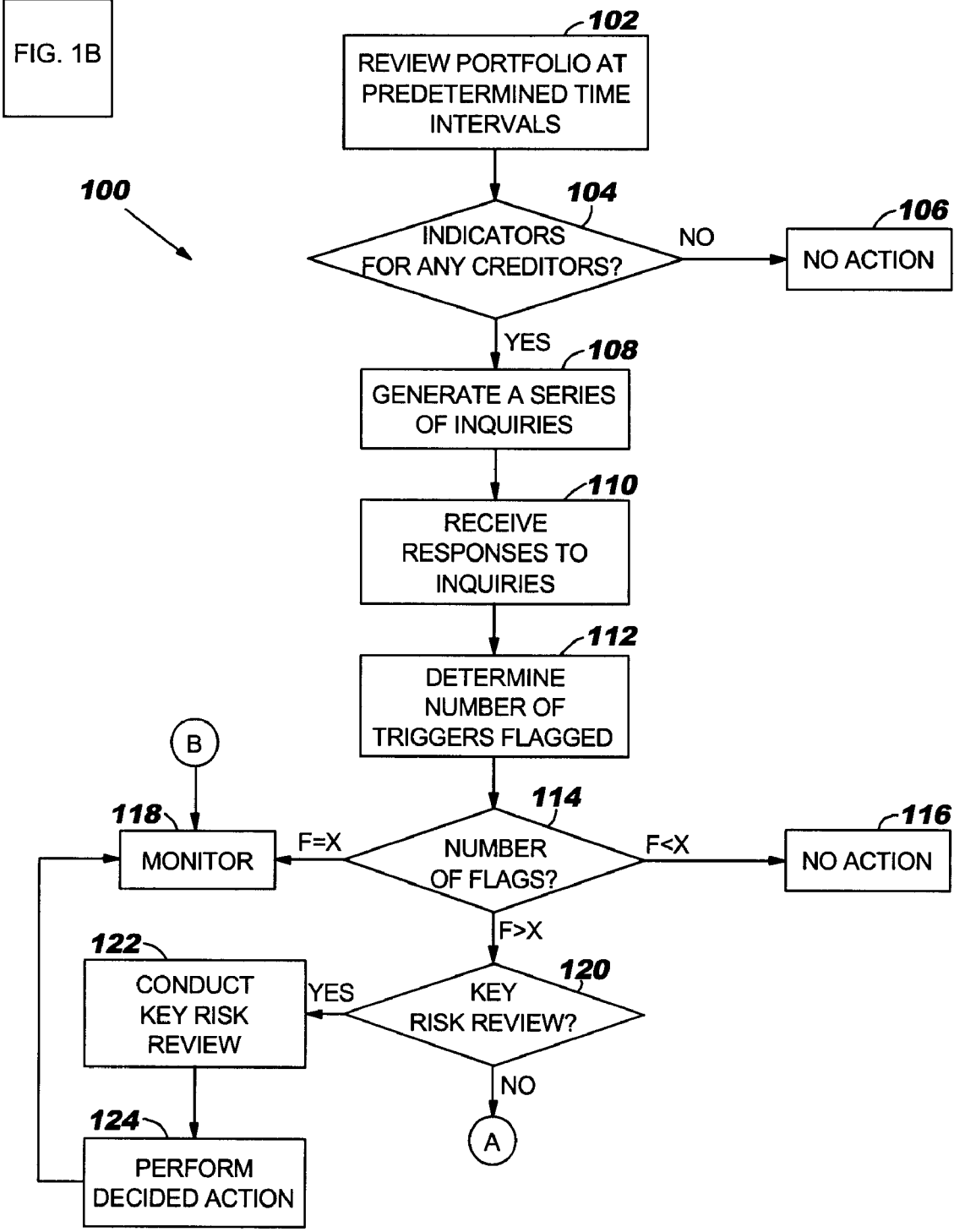

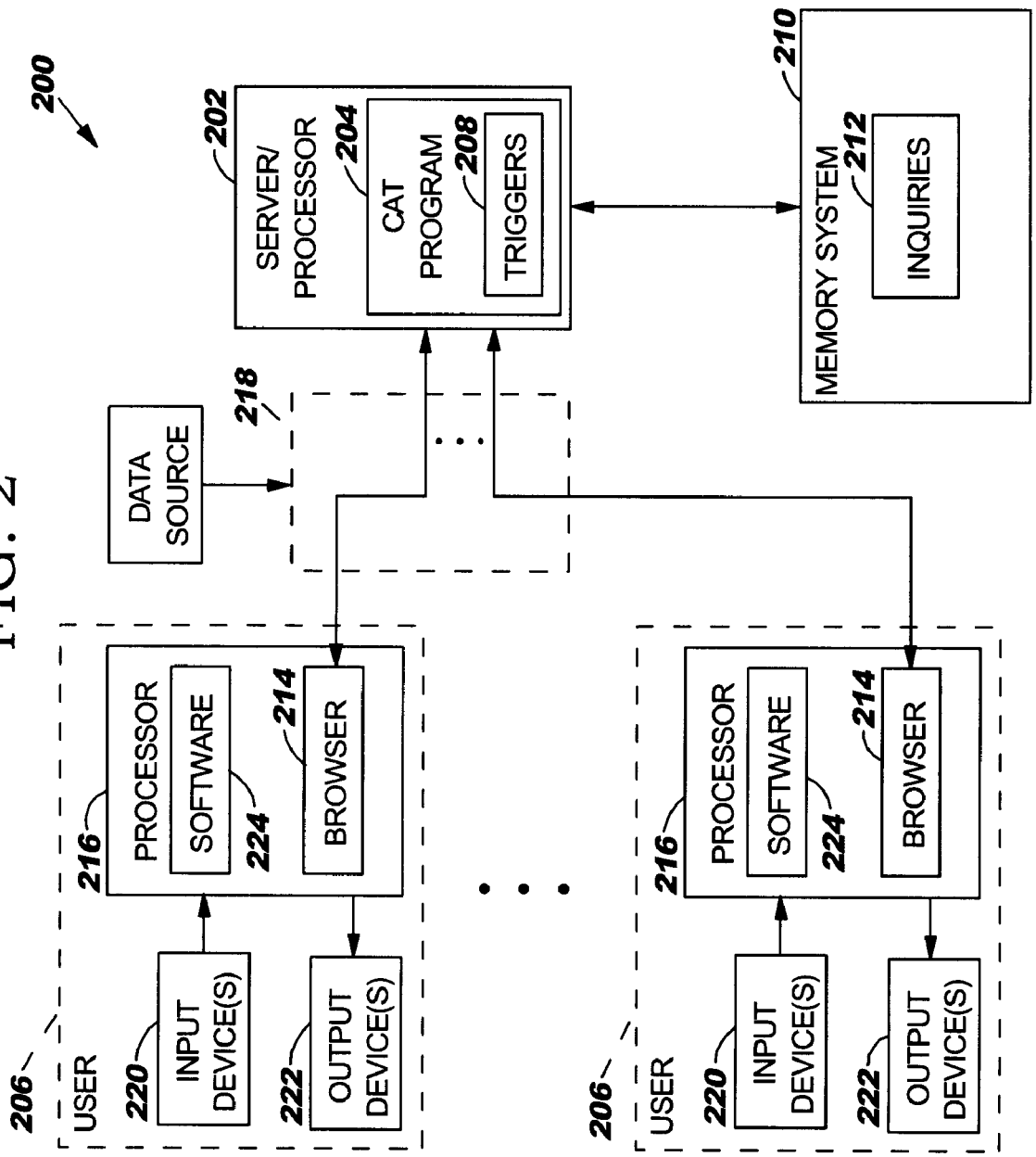

METHOD AND SYSTEM TO MANAGE A CREDIT PORTFOLIO AND TO TRIGGER CREDIT ACTIONS

BACKGROUND OF INVENTION

The present invention relates to monitoring and managing loans made to creditors and more particularly to a method and system to monitor and manage a credit portfolio or loans to creditors or clients and to trigger credit actions if warranted.

A default of a creditor's loan to a lending institution, bank or the like, may cost the lending institution a considerable amount of money in charge-offs. The lending institution may have several ways to detect credit deterioration at its disposal. However, these tools may be inefficient or may not be optimally utilized. For example, there may not be existing means for combining these tools, measures or signals to generate a cohesive credit-risk view of the creditor. Different measures may provide conflicting or inaccurate information. Additionally, the lending institution may not react appropriately to the signs of credit deterioration. A delay in properly reacting to such signs of deterioration and reacting inappropriately may result in irreversible and adverse financial or economic results to the creditor and the lending institution.

SUMMARY OF INVENTION

In accordance with an embodiment of the present invention, a method to manage a credit portfolio and to trigger credit actions may include determining a quantity of triggers flagged or activated for a selected creditor. The method may also include establishing an action plan in response to the quantity of flagged or activated triggers being greater than a predetermined number.

In accordance with another embodiment of the present invention, a method to manage a credit portfolio and to trigger credit actions may include generating a series of inquiries and determining a quantity of triggers flagged or activated based on responses to the series of inquiries for a selected creditor. The method may also include establishing an action plan in response to the quantity of flagged or activated triggers being greater than a predetermined number.

In accordance with another embodiment of the present invention, a system to manage a credit portfolio and to trigger credit actions may include a processor and at least one trigger. The system may also include a credit action trigger program operable on the processor to generate a series of inquiries and to determine a quantity of the at least one trigger being flagged or activated based on responses to the series of inquiries for a selected creditor.

In accordance with another embodiment of the present invention, a method of making a system to manage a credit portfolio and to trigger credit actions may include providing a processor and providing at least one trigger. The method may also include providing a credit action trigger program operable on the processor to generate a series of inquiries and to determine a quantity of the at least one trigger being flagged or activated based on responses to the series of inquiries for a selected creditor.

In accordance with another embodiment of the present invention, a computer-readable medium having computer-executable instructions performs a method that may include generating a series of inquiries and determining a quantity of triggers flagged or activated based on responses to the series of inquiries for a selected creditor. The method may also include establishing an action plan in response to the quantity of flagged or activated triggers being greater than a predetermined number.

BRIEF DESCRIPTION OF DRAWINGS

FIGS. 1A and 1B (collectively FIG. 1) are a flow chart of a method to manage a portfolio of creditors and to trigger credit actions in accordance with an embodiment of the present invention.

FIG. 2 is an example of a system to manage a portfolio of creditors and to trigger credit actions in accordance with an embodiment of the present invention.

DETAILED DESCRIPTION

Figure 1B:
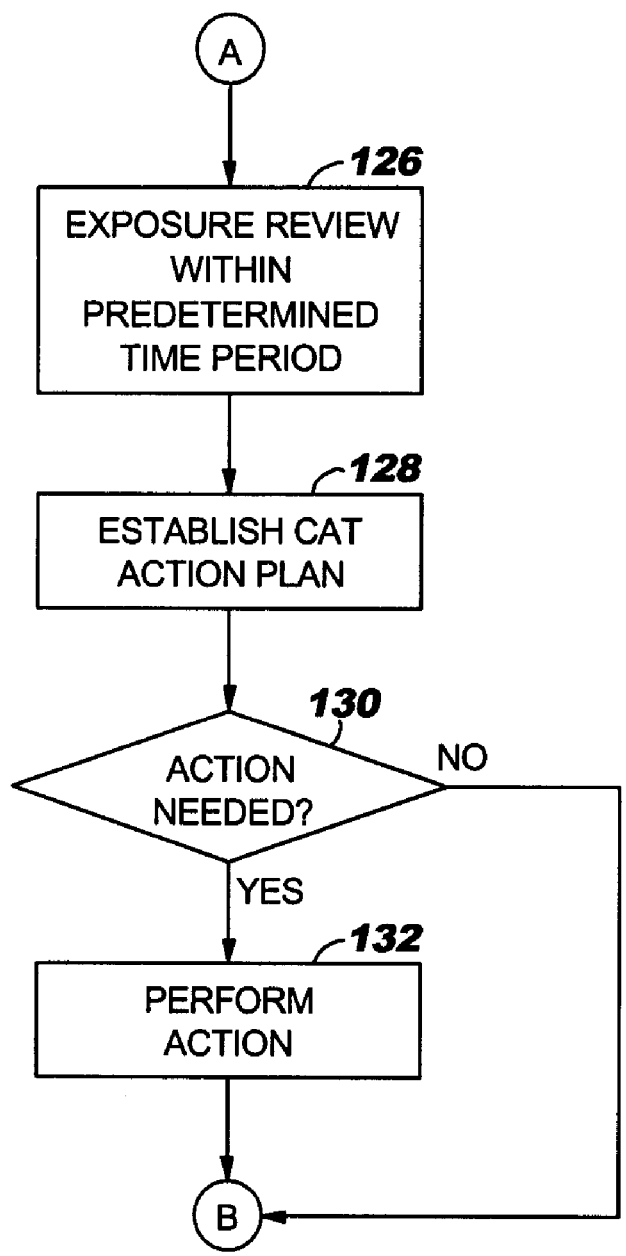

The following detailed description of preferred embodiments refers to the accompanying drawings which illustrate specific embodiments of the invention. Other embodiments having different structures and operations do not depart from the scope of the present invention.

FIGS. 1A and 1B (collectively FIG. 1) are a flow chart of a method 100 to manage a portfolio of creditors and to trigger credit actions in accordance with an embodiment of the present invention. In block 102, the portfolio may be reviewed periodically to determine if there are any status indicators for any creditors or clients in the portfolio. An example of a status indicator may include comparing predetermined models to each of the creditors. One type of model may be a market-based model using information from Capital Markets to estimate expectations about how a creditor may behave in the future. Several of these market-based models may be referred to as Merton Models after Robert Merton, the developer of the concept. An example of a widely used Merton model is a KealHoufer, McQuown, and Vasicek (KMV) model. KMV utilizes the stock price of firms to calculate the asset volatility, which may be an input into the Merton Model. Market-based models are essentially "top-down" approaches to measure credit risk. Another type of model that may be used is a fundamental-based model. Fundamental-based models may utilize financial statements and certain quantitative information to measure credit risk of a firm or company.

Other examples of status indicators may include market-related indicators, economic and industry related indicators. Economic and industry indicators may act as early-warning indicators or alarms of credit deterioration. Entire industries can migrate to a higher risk and more creditors in an industry can become susceptible to default depending upon how the whole industry may be faring. Economic indicators may be similar to or related to business cycles and can severely impact a company's ability to weather through such cycles and meet its financial obligations.

Another indicator or indicators may include subjective criteria or factors related to the creditor. For example, has the company or creditor began taking larger risks by moving to or relying on a more risky segment of their business, is the company's business model defective or broken or are they moving away from their business model for one reason or another.

Further indicators may include a recent event that is impacting the creditor or a change in the behavior, nature or demeanor of the creditor's management. Such events may include a market crash, terrorist attack, change in senior management, loss of key personal and the like.

If no indicators are present in block 104 from the periodic review in block 102, no action may be taken by the portfolio manager in block 106. If an indicator is present for a selected creditor in block 104, the method 100 may advance to block 108. In block 108, a series of inquiries may be generated. The inquiries may be a series of questions to which a portfolio manager may respond. The inquiries may be designed to elicit specific information related to the creditor and may be related to similar topics as the indicators discussed above. For example, the inquiries may elicit specific information about the creditor related to market, industry and economic conditions; subjective criteria related to the creditor; occurrence of an event affecting the selected creditor; management behavior or demeanor of the creditor; model-based factors or similar information related to the creditor. The user or credit portfolio manager may respond to the inquiries. The inquiries may be received by the system or method 100 in block 110.

In block 112, the method 100 may determine a quantity or number of triggers flagged or activated based on the responses by the user or portfolio manager to the series of inquiries for the selected creditor. The triggers may also be similar or related to the indicators. Examples of categories of triggers may include model-based triggers, market related triggers, subjective triggers, industry/economic triggers, event impact related triggers, corporate management behavior triggers or the like. One example of a model-based trigger may be any change in a Standard and Poor's (S&P) bond rating for the selected creditor by a predetermined number of grades or the like. Another example of a model-based trigger may be any change in a Moody's rating for the selected creditor by a predetermined number of grades or similar a change in any similar financial rating or measurement. One example of a market trigger may be any change in a Credit Default Swap spread or similar measure by a predetermined number of basis points in a predetermined time period. Another market based trigger may any change in the bond spread for the selected creditor by a predetermined number of basis points in a predetermined time period or any change in a similar financial measure of credit worthiness. An example of a subjective trigger may be whether the company's or creditor's business model is defective or broken, and an example of a industry/economic trigger may be if the company is in a industry that is experiencing a downturn. An example of an event trigger may be if the company has been sued or lost a suit, come under investigation by a governmental agency or suffered some other adverse occurrence with economic or financial consequences. An example of a behavioral trigger may be a nature or demeanor of the creditor's management or what has been the response of the corporate management to similar situations in the past.

In block 114, a determination may be made as to the number or quantity of triggers that have been flagged or activated by the responses to the inquiries. If the quantity of flags is less than a predetermined number (x) of flags in block 114, then no action may be taken in block 116. If the quantity of flags or active triggers is equal to the predetermined number (x) of flags in block 114, the selected creditor may be monitored more closely in block 118. If the quantity of flags or active triggers is greater than the predetermined number (x) of flags in block 114, then a decision may be made in block 120 if a key risk review should be performed or conducted. A decision may be made to conduct a key risk review in block 120 if the creditor represents a significant level of exposure or loss in the event the creditor were to go into bankruptcy or receivership. If a key risk review is determined to be warranted in block 120, the method 100 may advance to block 122 where the review may be conducted. Methods, actions or means to reduce exposure or loss may be discussed and decided upon in the key risk review 122. For example a decision may be made to hedge in secondary markets to offset any potential losses.

In block 124, the actions decided upon in the review 122 may be implemented or performs. The method 100 may advance from block 124 to block 118 where the results of the actions may be monitored for improvements.

If a decision is made in block 120 that a key risk review is not needed, the method 100 may advance to block 126. In block 126, an exposure review may be performed within a predetermined time period to determine how much is at stake if the debt becomes uncollectable or partially uncollectable. In block 128, a credit action trigger (CAT) plan may be established. The CAT plan may differ from one creditor to another and under different underlying circumstances. The CAT plan may take into account information about the creditor's different facilities, subsidiaries or the like to which loans have been extended. The CAT plan may also consider the size of the loans, any collateral securing such loans, balances due, ways to reduce exposure, availability of secondary markets, hedging and the like. Hedging in secondary markets may include purchasing a security instrument to reduce the effective exposure. Another example of hedging may be to enter into a credit default swap contract or the like. The CAT plan may document specific detailed actions to be taken and timing when these actions are to be taken.

In block 130 any actions needed to carry out the CAT plan may be determined. If actions are to be performed, such as purchasing a security instrument, entering into a credit default swap contract or the like, the actions may be carried out or performed in block in block 132. Whether no action is determined to be needed in block 130 or whatever actions are needed are performed in block 132, the method 100 may advance or return to block 118 where the creditor is closely monitored to determine any changes in status and the results of any actions.

FIG. 2 is an example of a system 200 to manage a portfolio of creditors and to trigger credit actions in accordance with an embodiment of the present invention. Elements of the method 100 of FIG. 1 may be embodied in the system 200. The system 200 may include a server or processor 202. A credit action trigger (CAT) program 204 may operate or run on the processor 202. The CAT program 204 may embody or contain elements of the method 100 of FIG. 1. The CAT program 204 may include computer-readable or computer-executable instructions to generate and transmit to one or more users 206 a series of inquiries 212. The CAT program may also include computer-readable or computer-executable instructions to determine a quantity or number of triggers 208 that may be flagged or activated based on responses by the user 206 or portfolio manager to the series of inquiries for a selected creditor. The inquiries and triggers may be similar to those previously described with respect to the method 100 of FIG. 1. The system 200 may also include a memory system 210. The memory system 210 may store the inquiries 212 or these may be included as part of the CAT program 204. The memory system 210 may also store the CAT program 204 and triggers 208.

The CAT program 204 may be accessed by a user 206 via a web type browser 214 or the like. The browser 214 may operate on a processor 216. The browser 214 may access the CAT program via a communication network 218 or medium. The communication network 218 or medium may be any communication system including by way of example, dedicated communication lines, telephone networks, wireless data transmission systems, two-way cable systems, customized computer networks, interactive kiosk networks, the Internet or the like. The communication system or medium 218 may also be or form part of a communication channel, memory or similar devices.

Each user terminal 206 may include input devices 220 and output devices 222 (either of which may also be a combination input and output device) to facilitate responding to the series of inquiries and to control operation of the method 100. Input device or devices 220 may include a keyboard, pointing device, voice recognition system or the like. The input device or devices 220 may also include optical, magnetic, infrared or radio frequency input devices or combination input/output devices, such as disk drives or the like. The input devices 220 may receive read or download software, computer-executable or readable instructions or the like, such as software 224 that may embody elements of the method 100. The software 224 may be downloaded from a communication network, system or medium, such as network or medium 218.

The output device or devices 222 may include a display or monitor, printer, audio system or the like to present the series of inquiries or other information produced by the method 100 of FIG. 1 to the user 206 or portfolio manager. The output devices 222 may also be coupled to a communication system, network or medium, such as the network or medium 218.

The system 200 may also include a data source 226 that may contain data or other information needed by the CAT program 204 to determine if any of the triggers 208 are flagged or activated. For example, the data source 226 may include S&P bond ratings, Moody's ratings and other financial data about the selected creditor, the industry and the economy. The data source 226 may be part of the system 200 or a separate element. The data source 226 may be accessed via the communication network 218.

Elements of the present invention, such as method 100 of FIG. 1 or the CAT program 204 of FIG. 2 may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in the medium for use by or in connection with a system, such as system 200 of FIG. 2. Examples of such a medium may be illustrated in FIG. 2 as input devices 220 or network 218. A computer-usable or readable medium may be any medium that may contain, store, communicate or transport the program for use by or in connection with a system, such as system 200. The medium, for example, may be an electronic, magnetic, optical, electromagnetic, infrared or semiconductor system or the like. The medium may also be simply a stream of information being retrieved when the computer program product is "downloaded" through a network, such as network 218, the Internet or the like. The computer-usable or readable medium could also be paper or another suitable medium upon which the program may be printed.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method to manage a credit portfolio and to trigger credit actions, comprising:
   reviewing a status of at least one creditor at predetermined time intervals through the use of a computing device processor, wherein each of the at least one creditor having an outstanding loan from an entity;
   identifying at least one status indicator for a creditor;
   selecting the creditor to review;
   generating a series of inquiries with reference to the creditor, wherein the series of inquires comprises a series of questions designed to elicit information related to the creditor;
   presenting the inquiries to a user associated with the entity;
   determining a quantity of triggers flagged for the selected creditor based on the responses to the inquiries from the user associated with the entity;
   determining if a key risk review is necessary for the creditor in response to the quantity of flagged triggers being greater than a predetermined number, wherein the key risk review is determined to be necessary if the selected creditor corresponds to a predetermined loss to the entity in the event the creditor becomes bankrupt; and
   conducting a key risk review in response to determining that a key risk review is necessary, wherein the key risk review comprises reviewing actions to reduce exposure or loss.

2. The method of claim 1, further comprising taking no action in response to not identifying any status indicators for the creditor.

3. The method of claim 1, wherein determining the quantity of triggers flagged for the selected creditor is performed in response to identifying at least one status indicator for the selected creditor.

4. The method of claim 1, further comprising receiving a response from the series of inquiries with reference to the selected creditor.

5. The method of claim 1, further comprising receiving a response from the series of inquiries related to at least one of a predetermined model related to the selected creditor, a market related to the selected creditor, subjective criteria related to the selected creditor, industry conditions, economic conditions, occurrence of an event affecting the selected creditor, and a behavior of the selected creditor.

6. The method of claim 1, further comprising:
   performing a decided action in response to the key risk review; and
   monitoring a status of the creditor.

7. The method of claim 1, further comprising performing an exposure review that determines how much is at stake if the outstanding loan becomes at least partially uncollectable in response to the quantity of flagged triggers being greater than the predetermined number and a key risk review not being performed.

8. A method to manage a credit portfolio and to trigger credit actions, comprising:
   electronically reviewing a status of a creditor, wherein the creditor has an outstanding loan from an entity;
   electronically determining at least one status indicator is associated with the creditor;
   electronically generating a series of inquiries;
   electronically receiving a response from the series of inquiries with reference to the selected creditor;
   electronically determining a quantity of triggers flagged based on responses to the series of inquiries for the selected creditor; and
   establishing an action plan in response to the quantity of flagged triggers being greater than a predetermined number;
   conducting a key risk review in response to the creditor corresponding to a predetermined loss in the event of bankruptcy; and performing an exposure review in response to the quantity of flagged triggers being greater than the predetermined number and a key risk review not being performed.

9. The method of claim 8, wherein each inquiry relates to one of a predetermined model related to the selected creditor, a market associated with the selected creditor, subjective criteria associated with the selected creditor, industry conditions, economic conditions, occurrence of an event affecting the selected creditor and a behavior of the selected creditor.

10. The method of claim 8, wherein determining a quantity of triggers flagged comprises at least one of:
   electronically determining any change in a Standard and Poor's (S&P) bond rating for the selected creditor by a predetermined number of grades;
   electronically determining any change in a Moody's rating for the selected creditor by a predetermined number of grades;
   electronically determining any change in a credit default swap spread for the selected creditor by a predetermined number of basis points in a predetermined time period;
   electronically determining any change in a bond spread for the selected creditor by a predetermined number of basis points in a predetermined time period;
   determining if the creditor has a broken or defective business model;
   determining if the creditor's industry is experiencing any downturn;
   determining any impact of any recent event on the creditor; and
   determining a nature or demeanor of the creditor's management.

11. The method of claim 8, further comprising:
   performing a decided action in response to the key risk review; and
   monitoring a status of the creditor.

12. The method of claim 8, further comprising taking no action in response to the quantity of flagged triggers being less than a predetermined number.

13. The method of claim 8, further comprising monitoring the selected creditor in response to the quantity of flagged triggers being greater than the predetermined number.

14. A system to manage a credit portfolio and to trigger credit actions, comprising:
   a central processing unit;
   at least one trigger; and
   a credit action trigger program operable on the central processing unit to:
      review a status of a creditor, wherein the creditor has an outstanding loan from an entity;
      determine at least one status indicator is associated with the creditor;
      generate a series of inquiries;
      receive a response from the series of inquiries with reference to the selected creditor;
      determine a quantity of the at least one trigger being flagged based on responses to the series of inquiries for the selected creditor
      conduct a key risk review in response to the creditor corresponding to a predetermined loss in the event of bankruptcy and the quantity of flagged triggers being greater than a predetermined number; and
      perform an exposure review in response to the quantity of flagged triggers being greater than the predetermined number and a key risk review not being performed.

15. The system of claim 14, wherein the series of inquires comprise at least one of:
   an inquiry including a predetermined model related to the selected creditor;
   an inquiry related to a market of the selected creditor;
   an inquiry including subjective criteria related to the selected creditor;
   an inquiry related to industry conditions in which the selected creditor does business;
   an inquiry related to economic conditions;
   an inquiry related to an impact of any events affecting the creditor; and
   an inquiry related to a behavior of the selected creditor.

16. The system of claim 14, wherein the at least one trigger comprises at least one of:
   any change in a Standard and Poor's (S&P) bond rating for the selected creditor by a predetermined number of grades;
   any change in a Moody's rating for the selected creditor by a predetermined number of grades;
   any change in a credit default swap spread for the selected creditor by a predetermined number of basis points in a predetermined time period;
   any change in a bond spread for the selected creditor by a predetermined number of basis points in a predetermined time period;
   a broken or defective business model;
   an industry of the selected creditor is experiencing any downturn;
   a determination of any impact of any recent event on the selected creditor; and
   a determination of a nature or demeanor of the selected creditor's management.

17. The system of claim 15, wherein the response received is received from a user associated with the entity, the system further comprising an input device for a user to respond to the series of inquiries.

18. The system of claim 15, further comprising a memory system to store the credit action trigger program and the inquiries.

19. The system of claim 15, further comprising an output device to present the series of inquiries to a user.

20. The system of claim 14, further comprising at least one other processor for users to access the credit action trigger program.

21. The system of claim 20, further comprising a browser operable on the at least one other processor to access the credit action trigger program.

22. A method of making a system to manage a credit portfolio and to trigger credit actions, comprising:
   providing a central processing unit;
   providing at least one trigger; and
   providing a credit action trigger program operable on the central processing unit to:
      review a status of a creditor, wherein the creditor has an outstanding loan from an entity;
      determine, via the central processing unit, at least one status indicator is associated with the creditor;
      generate a series of inquiries;
      receive a response from the series of inquiries with reference to the selected creditor;
      determine a quantity of the at least one trigger being flagged based on responses to the series of inquiries for the selected creditor
      conduct a key risk review in response to the creditor corresponding to a predetermined loss in the event of bankruptcy and the quantity of flagged triggers being greater than a predetermined number; and perform an exposure review in response to the quantity of flagged triggers being greater than the predetermined number and a key risk review not being performed.

23. The method of claim 22, further comprising:
forming an inquiry including a predetermined model related to the selected creditor;
forming an inquiry related to a market of the selected creditor;
forming an inquiry including subjective criteria related to the selected creditor;
forming an inquiry related to industry conditions in which the selected creditor does business;
forming an inquiry related to economic conditions;
forming an inquiry related to an impact of any events affecting the creditor; and
forming an inquiry related to a behavior of the selected creditor.

24. The method of claim 22, wherein providing the at least one trigger comprises:
providing means to electronically determine any change in a Standard and Poor's (S&P) bond rating for the selected creditor by a predetermined number of grades;
providing means to electronically determine any change in a Moody's rating for the selected creditor by a predetermined number of grades;
providing means to electronically determine any change in a credit default swap spread for the selected creditor by a predetermined number of basis points in a predetermined time period;
providing means to electronically determine any change in a bond spread for the selected creditor by a predetermined number of basis points in a predetermined time period;
providing means to determine a broken or defective business model;
providing means to determine if an industry of the selected creditor is experiencing any downturn;
providing means for determining any impact of any recent event on the selected creditor; and
providing means for determining a nature or demeanor of the selected creditor's management.

25. The method of claim 22, further comprising providing an output device to present the series of inquiries to a user associated with the entity.

26. The method of claim 22, further comprising an input device for a user associated with the entity to respond to the series of inquiries.

27. The method of claim 22, further comprising providing a memory system to store the credit action trigger program and the inquiries.

28. A non-transitory computer-readable medium having computer-executable instructions for performing a method once the instructions are executed on a computer, comprising:
reviewing a status of a creditor at predetermined time intervals, wherein the creditor has an outstanding loan from an entity;
identifying at least one status indicator is associated with the creditor; and
selecting the creditor to review;
generating a series of inquiries with reference to the creditor;
determining a quantity of triggers flagged based on responses to the series of inquiries for a selected creditor; and
establishing an action plan in response to the quantity of flagged triggers being greater than a predetermined number.

29. The computer-readable medium having computer-executable instructions for performing the method of claim 28, wherein each inquiry relates to one of a predetermined model related to the selected creditor, a market associated with the selected creditor, subjective criteria associated with the selected creditor, industry conditions, economic conditions, occurrence of an event affecting the selected creditor and a behavior of the selected creditor.

30. The computer-readable medium having computer-executable instructions for performing the method of claim 28, wherein determining a quantity of triggers flagged comprises at least one of:
determining any change in a Standard and Poor's (S&P) bond rating for the selected creditor by a predetermined number of grades;
determining any change in a Moody's rating for the selected creditor by a predetermined number of grades;
determining any change in a credit default swap spread for the selected creditor by a predetermined number of basis points in a predetermined time period;
determining any change in a bond spread for the selected creditor by a predetermined number of basis points in a predetermined time period;
determining if the creditor has a broken or defective business model;
determining if the creditor's industry is experiencing any downturn;
determining any impact of any recent event on the creditor; and
determining a nature or demeanor of the creditor's management.

31. The computer-readable medium having computer-executable instructions for performing the method of claim 28, further comprising taking no action in response to the quantity of flagged triggers being equal to the predetermined number.

32. The computer-readable medium having computer-executable instructions for performing the method of claim 28, further comprising monitoring the selected creditor in response to the quantity of flagged triggers being equal to the predetermined number.

33. The method of claim 8, wherein determining a quantity of triggers flagged comprises:
determining any change in a Standard and Poor's (S&P) bond rating for the selected creditor by a predetermined number of grades;
determining any change in a Moody's rating for the selected creditor by a predetermined number of grades;
determining any change in a credit default swap spread for the selected creditor by a predetermined number of basis points in a predetermined time period;
determining any change in a bond spread for the selected creditor by a predetermined number of basis points in a predetermined time period;
determining if the creditor has a broken or defective business model;
determining if the creditor's industry is experiencing any downturn;
determining any impact of any recent event on the creditor; and
determining a nature or demeanor of the creditor's management.

* * * * *